(12) United States Patent
Serrano et al.

(10) Patent No.: US 6,944,002 B2
(45) Date of Patent: Sep. 13, 2005

(54) AUTOMATIC TRANSFER SWITCH AND PROTECTION DEVICE

(75) Inventors: Mark Anthony Serrano, Chicago, IL (US); Michael J. Schlemmer, Bolingbrook, IL (US); Dariusz Fudala, Bridgeview, IL (US); Michael Tobin, Burlington, CT (US)

(73) Assignee: General Electric Company, Schenectady, NY (US)

( * ) Notice: Subject to any disclaimer, the term of this patent is extended or adjusted under 35 U.S.C. 154(b) by 59 days.

(21) Appl. No.: 10/661,298

(22) Filed: Sep. 12, 2003

(65) Prior Publication Data

US 2005/0057878 A1 Mar. 17, 2005

(51) Int. Cl.[7] .................................................. H02H 7/00
(52) U.S. Cl. ........................ 361/62; 361/93.1; 361/104
(58) Field of Search ................................. 361/104, 103, 361/62, 64, 66, 18, 160, 115, 93.1, 78

(56) References Cited

U.S. PATENT DOCUMENTS 3,602,807 A * 8/1971 Prescott ...................... 323/341
5,023,469 A    6/1991 Bassett et al. ................. 307/64
5,739,594 A    4/1998 Sheppard et al. .............. 307/64
6,501,196 B1  12/2002 Lo .............................. 307/125

* cited by examiner

Primary Examiner—Stephen W. Jackson
(74) Attorney, Agent, or Firm—Ohlandt, Greeley, Ruggiero & Perle, L.L.P.

(57) ABSTRACT

An automatic transfer switch and protection device is provided. The device includes a contact, a drive assembly, and a controller. The contact is movable among a first position, a second position, and a third position. The drive assembly moves the contact among the first, second, and third positions. The controller receives a first signal indicative of a condition of power in a first power source and a second power source. The controller provides a second signal to the drive assembly to move the contact in response to the first signal. The contact can provide power to a load from the first source in the first position, from the second source in the second position, and can isolate the load from the first and second sources in the third position.

20 Claims, 3 Drawing Sheets

AUTOMATIC TRANSFER SWITCH AND PROTECTION DEVICE

BACKGROUND

The present disclosure is related to automatic transfer switches. More particularly, the present disclosure is related to automatic transfer switches having integral protection functions.

Automatic transfer switches have become common in many industrial and residential power distribution systems. Automatic transfer switches are typically used to automatically transfer power distributed from two or more power sources to a load. In the industrial setting, many industrial facilities are configured to receive power from two or more sources. These sources can be different power grids, different points on the same power grid, a generator, and any combinations of the foregoing. Thus, in the event that power is unavailable or unsuitable from one of the sources, the automatic transfer switch can transfer the system to draw power from the second source.

In the residential setting, some homes have been equipped with a back-up electric generator, such as a solar array, a fuel cell, a gas generator, a windmill, and any combination thereof. The automatic transfer switch has been used to provide power from the back-up generator in the event of a power outage from the local utility company.

However, the complexity and cost of prior systems having automatic transfer switches have limited their utility in many applications. Accordingly, there is a need for lower cost, lower complexity systems having automatic transfer switching and protection capabilities.

SUMMARY

An automatic transfer switch and protection device is provided. The device includes a contact, a drive assembly, and a controller. The contact is movable among a first position, a second position, and a third position. The drive assembly moves the contact among the first, second, and third positions. The controller receives a first signal indicative of a condition of power in a first power source and a second power source. The controller provides a second signal to the drive assembly to move the contact in response to the first signal. The contact can provide power to a load from the first source in the first position, from the second source in the second position, and can isolate the load from the first and second sources in the third position.

An automatic transfer and protection device having a contact, a controller, and a drive assembly is also provided. The contact moves among a first position, a second position, and a third position. The first position places a load in electrical communication with a first power source. The second position places the load in electrical communication with a second power source. Third position isolates the load from the first and second power sources. The controller receives a first signal and generates a second signal in response to the first signal. The drive assembly receives the second signal and moves the contact among the first, second, and third positions in response to the second signal.

An automatic transfer and protection device is provided that has a first contact position, a second contact position, a third contact position, and a moving means. The first contact position places a load in electrical communication with a first power source. The second contact position places the load in electrical communication with a second power source. The third contact position isolates the load from the first and second power sources. The moving means moves among the first, second, and third contact positions in response to a condition of power in the first and second power sources.

The above-described and other features and advantages of the present disclosure will be appreciated and understood by those skilled in the art from the following detailed description, drawings, and appended claims.

DETAILED DESCRIPTION

Figure 1:
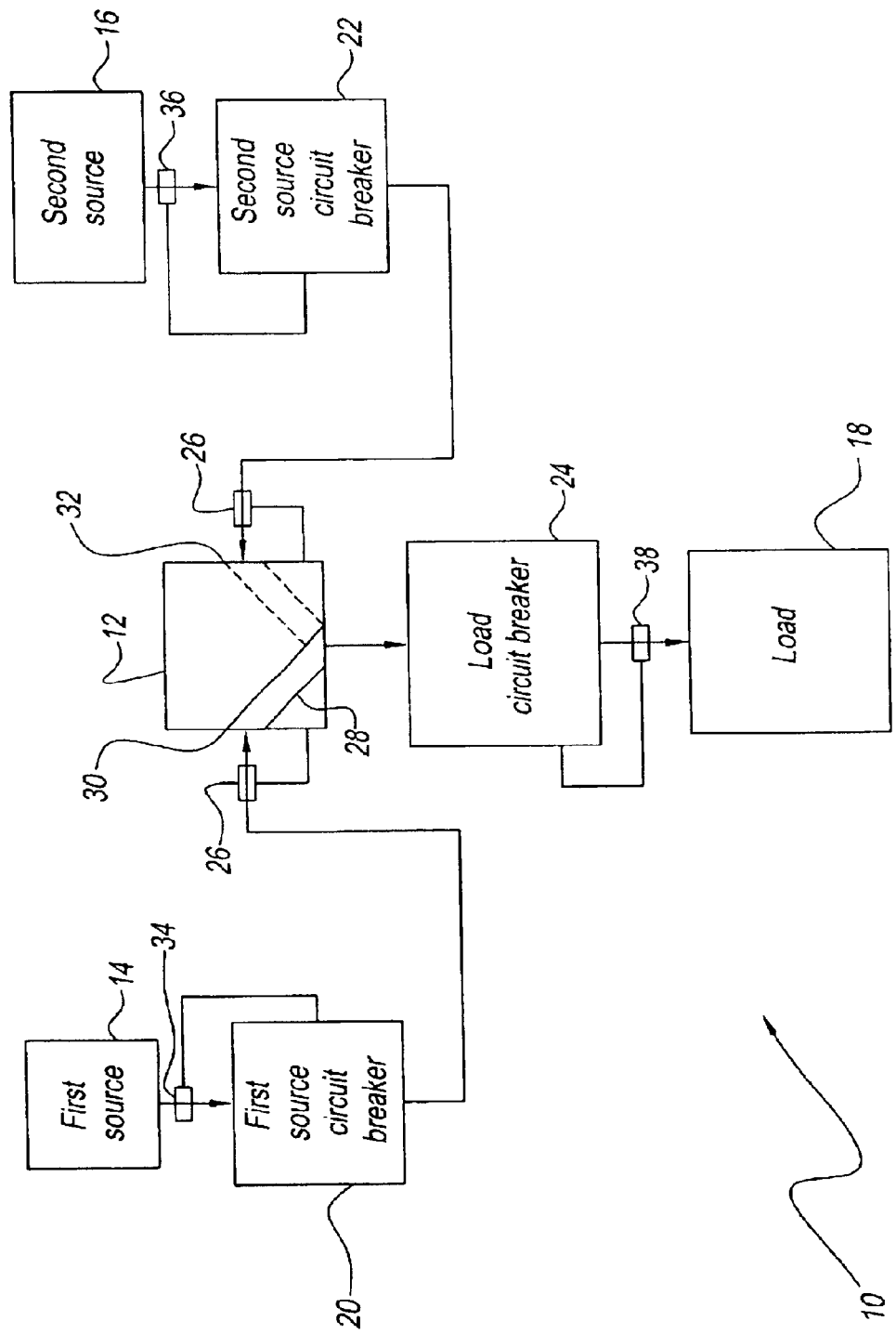
FIG. 1 is a schematic depiction of a power distribution system having a typical automatic transfer switch.

Referring to the drawings and in particular to FIG. 1, a power distribution system 10 having a typical automatic transfer switch 12 is illustrated. Switch 12 is configured to supply power from a first source 14 or a second source 16 to a load 18. Load 18 can be any residential or industrial power consuming device such as, but not limited to, a light, a motor, a compressor, a computer, and other devices. For purposes of clarity, system 10 is illustrated having two power sources and one load. Of course, it is contemplated for system 10 to have more than two power sources and/or more than one load.

Switch 12 is configured to selectively couple first source 14 or second source 16 to load 18. For example, first source 14 can be a local utility source and second source 16 can be a back-up generator. In this example, switch 12 can deliver power from first source 14 to load 18 under normal operating conditions, but can switch to deliver power from second source 16 to the load in the event that power from the first source becomes unavailable and/or unsuitable.

System 10 requires multiple circuit breakers to protect the transfer switch, the sources, and/or the load from one another. In the illustrated example, system 10 has a first circuit breaker 20 for protection between first source 14 and switch 12. System 10 also has a second circuit breaker 22 for protection between second source 16 and switch 12. Further, system 10 includes a third circuit breaker 24 for protection between switch 12 and load 18.

Switch 12 can include one or more sensors 26 for detecting a condition of power from first and second sources 14, 16, respectively. Sensors 26 allow switch 12 to detect the condition of power from first and second sources 14, 16, respectively. Sensors 26 can be sensors such as, but not limited to, potential transformers, current transformers, and any combination thereof.

Based on this detected condition, switch 12 automatically transfers power delivered to load 18 between first and second sources 14, 16 to minimize the outage down time and ensure that the load is constantly powered. Specifically, switch 12 has a contact 28 that is movable between a first position 30 and a second position 32 (illustrated in phantom). In first position 30, contact 28 places load 18 in electrical communication with first source 14. Conversely, contact 28 places load 18 in electrical communication with second source 16 when the contact is in second position 32.

First circuit breaker 20 can include one or more sensors 34 for detecting a condition of power from first source 14.

Similarly, second circuit breaker 22 can include one or more sensors 36 for detecting a condition of power from second source 16. Further, third circuit breaker 24 can include one or more sensors 38 for detecting a condition of power from switch 12. Sensors 34, 36 allow breakers 20, 22, 24 to detect the condition of power from first and second sources 14, 16, respectively. Similarly, third sensors 38 allow third breaker 24 to protect load 18 from the power delivered by switch 12. Based on the power condition detected by sensors 32, 34, 36, breakers 20, 22, 24 can automatically open in a known manner to protect the various components in system 10.

Unfortunately, system 10 has a level of complexity and cost that can be undesirable in many applications. In addition, the complexity of system 10 can reduce the reliability of the distribution of power to load 18.

Figure 2:
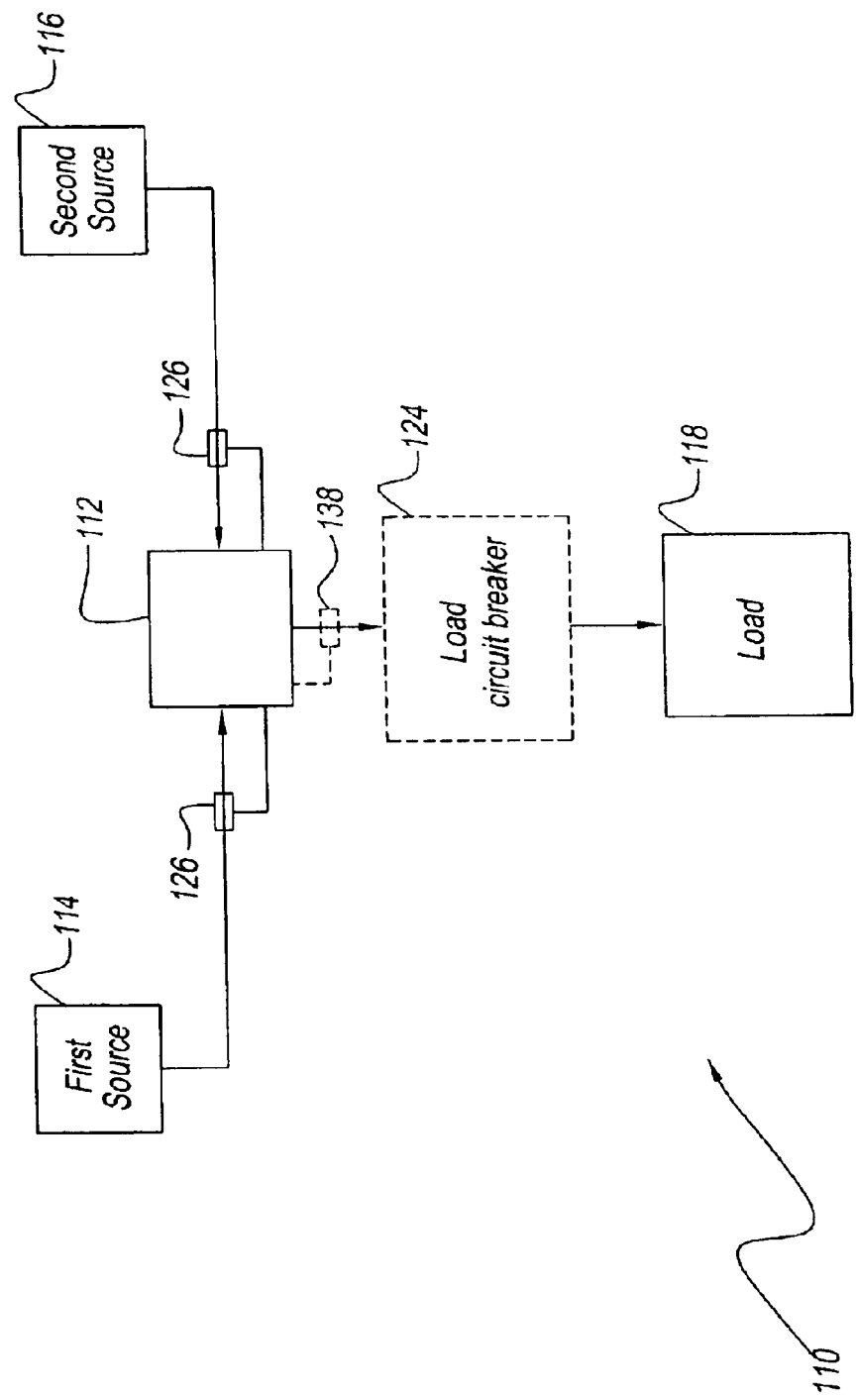
FIG. 2 is a schematic depiction of a power distribution system having an exemplary embodiment of an automatic transfer switch and protection device according to the present disclosure.
Figure 3:
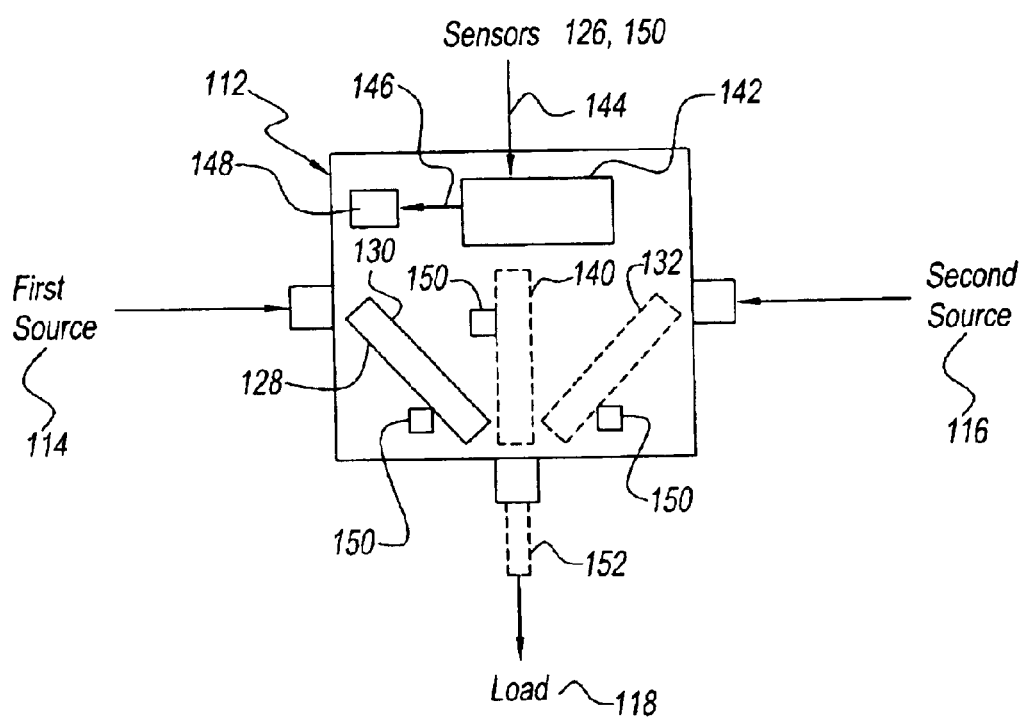
FIG. 3 is a schematic depiction the device of FIG. 2.

Turning now to FIGS. 2 and 3, a power distribution system 110 having an exemplary embodiment of an automatic transfer switch and protection device 112 are illustrated. Here, component parts performing similar and/or analogous functions are labeled in multiples of one hundred.

Advantageously, device 112 operates as both a switch and a protection device. For example, device 112 is configured to selectively supply power from a first source 114 or a second source 116 to a load 118. In addition, device 112 is configured to protect the various components of system 110 by automatically opening upon detection of a power condition above a predetermined set-point.

Load 118 can be any power drawing device such as, but not limited to, a light, a motor, a computer, and other devices. For purposes of clarity, system 110 is illustrated having two power sources and one load. Of course, it is contemplated for system 110 to have more than two power sources and/or more than one load.

Device 112 has a contact 128 that is movable between a first position 130, a second position 132 (illustrated in phantom), and a third position 140. In first position 130, contact 128 places load 118 in electrical communication with first source 114. Similarly, contact 128 places load 118 in electrical communication with second source 116 when the contact is in second position 132. Third position 140 is an open or protection position. When contact 128 is in third position 140, device 112 isolates load 118 from both first and second source 114, 116. Specifically, load 118 is not in electrical communication with either first or second source 114, 116 when device 112 moves contact 128 to third position 140.

Device 112 includes a controller 142 for controlling the operation of contact 128. In an exemplary embodiment, controller 142 is a processing unit, such as an electronic trip unit. Alternately, it is contemplated by the present disclosure for controller 142 to include a control circuit, a processing unit, and a thermal-magnetic trip device. Of course, it is contemplated by the present disclosure for controller 142 to include any combination of one or more of the foregoing.

Device 112 includes one or more sensors 126 for detecting a condition of power from first and second sources 114, 116, respectively (e.g., line side of device 112). In some embodiments, device 112 also includes one or more sensors 138 for detecting the condition of power consumed by load 118 (e.g., load side of device 112). Sensors 126, 138 can be sensors such as, but not limited to, potential transformers, current transformers, and any combination thereof.

Device 112 can also include sensors 150 for detecting the position of contact 128. Here, sensors 150 can ensure that device 112 knows whether contact 128 is in first position 130, second position 132, or third position 140.

Sensors 126, 138, 150 provide one or more first signals 144 to controller 142. Based on first signals 144, controller 142 determines a desired position for contact 128, namely first position 130, second position 132, or third position 140. Controller 142 is configured to send a second signal 146 corresponding to the desired position of contact 128. Controller 142 sends second signal 146 to a drive assembly 148. Drive assembly 148 is configured to move contact 128 among the first position 130, the second position 132, and the third position 140, respectively. Drive assembly 148 can be a drive, such as but not limited to, a solenoid, a motor, a magnetically positioned device, and others.

During normal operation, controller 142 maintains contact 128 in first position 130 so that power from first source 114 is provided to load 118. In the event that power from first source 114 is unavailable or unacceptable as detected by sensors 126, controller 142 can move contact 128 to second position 132 so that power from second source 116 is provided to load 118. In the event that power from second source 116 becomes unavailable or unacceptable or that power from first source 114 is restored as detected by sensors 126, controller 142 can move contact 128 back to first position 130 so that power from the first source is provided to load 118. In this manner, device 112 can minimize the outage down time and ensure that load 118 is constantly powered.

In some embodiments, it can be desired to delay the transfer of power between first and second sources 114, 116 to load 118. For example, load 118 can oftentimes include a large motor, the rotation of which can create deleterious back electromagnetic fields (EMF) in system 110. In this example, it can be desired to allow a short delay in the delivery of power to the motor to allow the inertia of the motor to slow, but not stop. This can mitigate the inertia effects of the motor and, thus, mitigate the deleterious back EMF effects. Specifically, it can be desired to briefly isolate load 118 from first and second sources 114, 116. Here, when power from first source 114 is unavailable or unacceptable as detected by sensors 126, controller 142 can move contact 128 to third position 140 for a predetermined time (e.g., delay) prior to moving the contact to second position 132. It is contemplated for the predetermined time or delay to be between about zero (0) seconds and about thirty (30) seconds. For example, is contemplated for the predetermined time or delay to be between about five (5) seconds.

In the event that power from both first and second sources 114, 116 is unavailable and/or unacceptable as detected by sensors 126, controller 142 can move contact 128 to third position 140 so that load 118 is isolated from both the first and the second sources. In addition, device 112 is configured to move contact 128 to third position 140 so that load 118 is isolated from both the first and the second sources in the event that the power consumed by the load as detected by sensors 138 is above a predetermined limit.

Accordingly, device 112 receives first signals 144 from sensors 126, 138, 150 in system 110. Based on first signals 144, controller 142 determines second signal 146 representative of the desired position for contact 128. Controller 142 then provides second signals 146 to drive assembly 148 to move contact 128 to the desired position. In this manner, device 112 can automatically and selectively provide power to load 118 from first source 114 or second source 116. In addition, device 112 can selectively isolate load 118 from the first and second sources 114, 116 as needed.

In some embodiments, it may be desired to provide device 112 with a supplementary protection device 152 for protecting load 118. For example, supplementary protection device 152 can be a load-sensing fuse as illustrated in FIG. 3 positioned between contact 128 and load 118. In other embodiments, system 110 can include a third breaker 124 positioned between device 112 and load 118 to add yet another level of protection.

Accordingly, device 112 can combine the typical transfer switch functionality and electronic trip unit functionality with load sensing fuses to create an integrated automatic transfer and protection device that protects load 118 without the expense and complexity required by traditional systems.

It should also be noted that the terms "first", "second", "third", "upper", "lower", and the like may be used herein to modify various elements. These modifiers do not imply a spatial, sequential, or hierarchical order to the modified elements unless specifically stated.

While the present invention has been described with reference to one or more exemplary embodiments, it will be understood by those skilled in the art that various changes may be made and equivalents may be substituted for elements thereof without departing from the scope of the present invention. In addition, many modifications may be made to adapt a particular situation or material to the teachings of the disclosure without departing from the scope thereof. Therefore, it is intended that the present invention not be limited to the particular embodiment(s) disclosed as the best mode contemplated for carrying out this invention, but that the invention will include all embodiments falling within the scope of the appended claims.

What is claimed is:

1. An automatic transfer switch and protection device comprising:
   a contact movable among a first position, a second position, and a third position;
   a drive assembly for moving said contact among said first, second, and third positions; and
   a controller for receiving a first signal indicative of a condition of power in a first power source and a second power source, said controller providing a second signal to said drive assembly to move said contact among said first, second, and third positions in response to said first signal, wherein said contact can provide power to a load from said first source in said first position, to said load from said second source in said second position, and can isolate said load from said first and second sources in said third position.

2. The device as in claim 1, wherein said first signal is indicative of said condition of power in said first power source, said condition of power in said second power source, said condition of power in a load side of said contact, a position of said contact, and combinations thereof.

3. The device as in claim 1, further comprising a sensor for determining whether said contact is in said first position, said second position, or said third position.

4. The device as in claim 1, wherein said controller is a processor, a circuit, a thermal-magnetic trip device, and any combination of the foregoing.

5. An automatic transfer switch and protection device comprising:
   a contact movable among a first position, a second position, and a third position;
   a drive assembly for moving said contact among said first, second, and third positions; and
   a controller for receiving a first signal indicative of a condition of power in a first power source and a second power source, said controller providing a second signal to said drive assembly to move said contact among said first, second, and third positions in response to said first signal, wherein said contact can provide power to a load from said first source in aid first position, to said load from said second source in said second position, and can isolate said load from said first and second sources in said third position, wherein said controller is an electronic trip unit.

6. An automatic transfer switch and protection device comprising:
   a contact movable among a first position, a second position, and a third position;
   a drive assembly for moving said contact among said first, second, and third positions;
   a controller for receiving a first signal indicative of a condition of power in a first power source and a second power source, said controller providing a second signal to said drive assembly to move said contact among said first, second, and third positions in response to said first signal, wherein said contact can provide power to a load from said first source in said first position, to said load from said second source in said second position, and can isolate said load from said first and second sources in said third position; and
   a load-sensing fuse positioned between said contact and said load.

7. The device as in claim 1, wherein said drive assembly is a device selected from the group consisting of a solenoid, a motor, and a magnetically positioned device.

8. An automatic transfer switch and protection device comprising:
   a contact movable among a first position, a second position, and a third position, said first position being configured to place a load in electrical communication with first power source, said second position being configured to place said load in electrical communication with a second power source, and said third position being configured to isolate said load from said first and second power sources;
   a controller for receiving a first signal and for generating a second signal in response to said first signal; and
   a drive assembly configured to receive said second signal and to move said contact among said first, second, and third positions in response to said second signal.

9. An automatic transfer switch and protection device comprising:
   a contact movable among a first position, a second position, and a third position, said first position being configured to place a load in electrical communication with first power source, said second position being configured to place said load in electrical communication with a second power source, and said third position being configured to isolate said load from said first and second power sources;
   a controller for receiving a first signal and for generating a second signal in response to said first signal; and
   a drive assembly configured to receive said second signal and to move said contact among said first, second, and third positions in response to said second signal, wherein said first signal comprises a condition of power and a position of said contact.

10. The device as in claim 9, wherein said condition of power is representative of power in a load side of said contact, power in said first power source, and power in said second power source.

11. An automatic transfer switch and protection device comprising:
- a contact movable among a first position, a second position, and a third position, said first position being configured to place a load in electrical communication with first power source, said second position being configured to place said load in electrical communication with a second power source, and said third position being configured to isolate said load from said first and second power sources;
- a controller for receiving a first signal and for generating a second signal in response to said first signal;
- a drive assembly configured to receive said second signal and to move said contact among said first, second, and third positions in response to said second signal; and
- a load-sensing fuse positioned between said contact and said load.

12. An automatic transfer switch and protection device comprising:
- a contact movable among a first position, a second position, and a third position, said first position being configured to place a load in electrical communication with first power source, said second position being configured to place said load in electrical communication with a second power source, and said third position being configured to isolate said load from said first and second power sources;
- a controller for receiving a first signal and for generating a second signal in response to said first signal; and
- a drive assembly configured to receive said second signal and to move said contact among said first, second, and third positions in response to said second signal, wherein said controller is a processor, a circuit, a thermal-magnetic trip device, and any combination of the foregoing.

13. An automatic transfer switch and protection device comprising:
- a first contact position configured to place a load in electrical communication with a first power source;
- a second contact position configured to place said load in electrical communication with a second power source;
- a third contact position configured to isolate said load from said first and second power sources; and
- means for moving among said first, second, and third contact positions in response to a condition of power in said first and second power sources.

14. The device as in claim 13, wherein said condition of power comprises a first signal.

15. The device as in claim 14, wherein said first signal further comprises a load power consumption.

16. The device as in claim 14, wherein said first signal further comprises an indication of whether the device is in said first contact position, said second contact position, or third contact position.

17. An automatic transfer switch and protection device comprising:
- a first contact position configured to place a load in electrical communication with a first power source;
- a second contact position configured to place said load in electrical communication with a second power source;
- a third contact position configured to isolate said load from said first, and second power sources; and
- a controller for receiving a first signal indicative of said condition of power, said controller sending a second signal to a drive assembly in response to said first signal, said drive assembly moving among said first, second and third contact positions in response to said second signal.

18. The device as in claim 17, wherein said drive assembly is a device selected from the group consisting of a solenoid, a motor, and a magnetically positioned device.

19. The device as in claim 17, wherein said controller is a processor, a circuit, a thermal-magnetic trip device, and any combination of the foregoing.

20. The device as in claim 19, further comprising a load-sensing fuse positioned between said load and said first, second, and third contact positions.

* * * * *